Oct. 30, 1923.　　　　　　　　　　　　　　　　　　　1,472,624
C. A. BAER
COMBINED POWER AND TRANSMISSION UNIT
Filed June 22, 1921　　　2 Sheets-Sheet 1
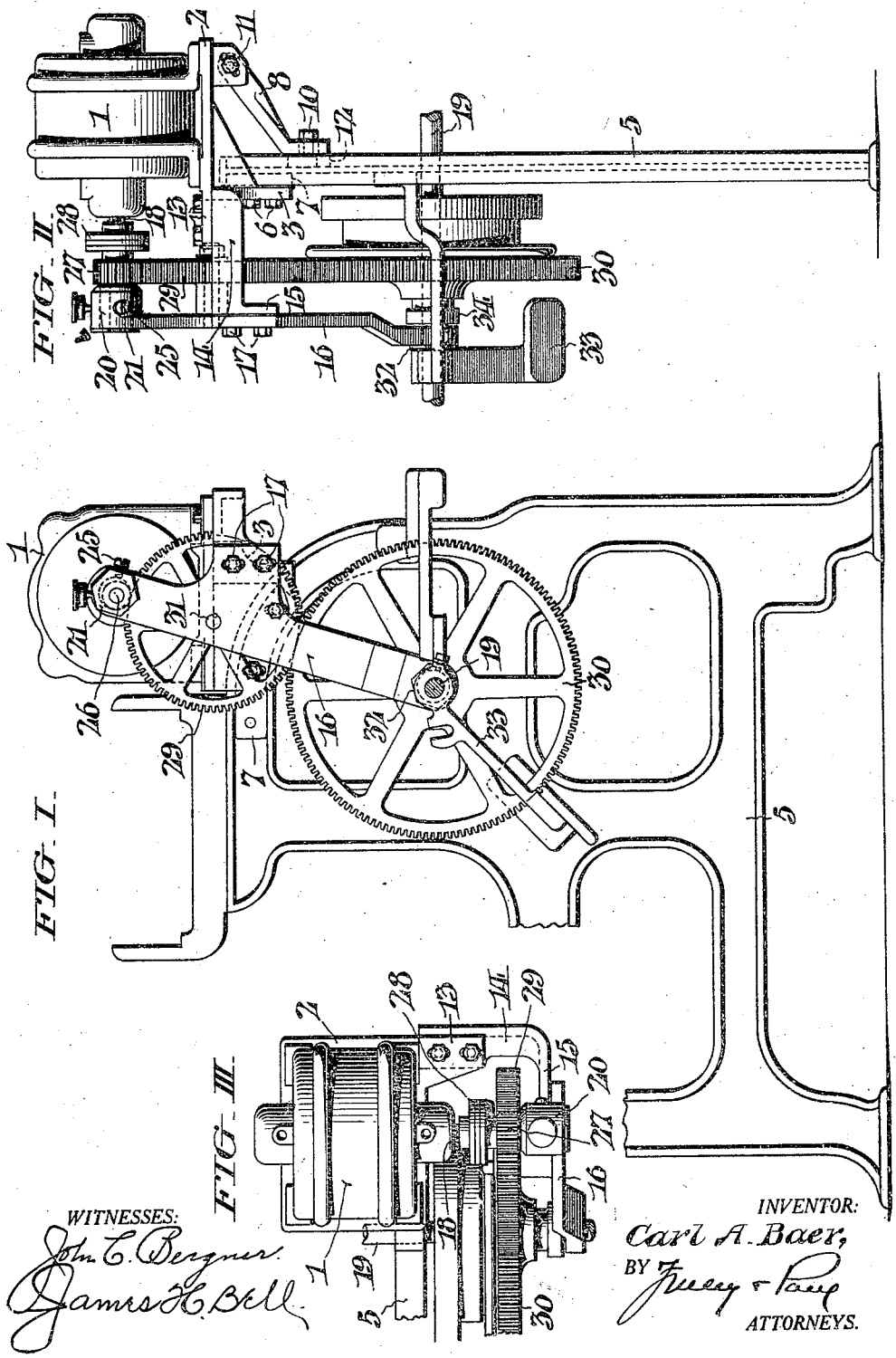
WITNESSES:
INVENTOR:
Carl A. Baer,
BY
ATTORNEYS.

Oct. 30, 1923. 1,472,624
C. A. BAER
COMBINED POWER AND TRANSMISSION UNIT
Filed June 22, 1921 2 Sheets-Sheet 2
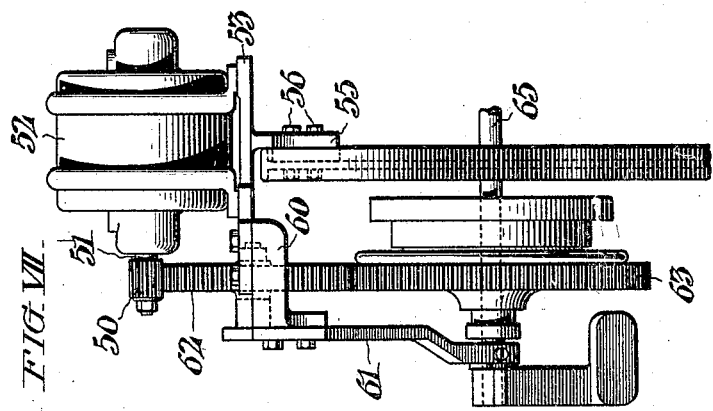
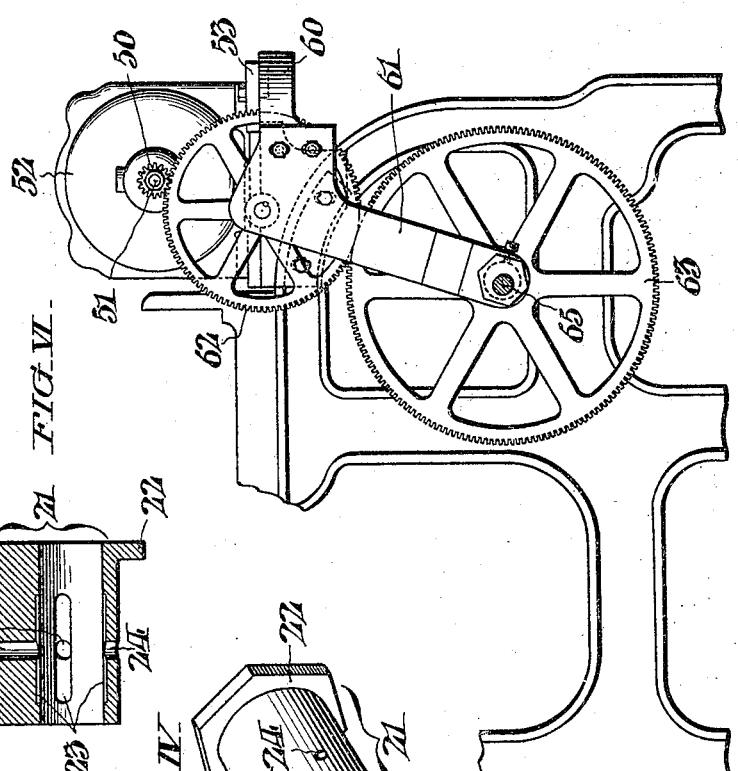
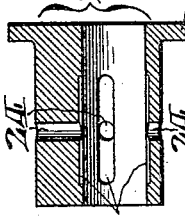
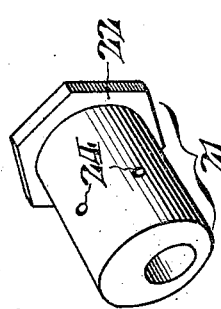
WITNESSES:
John C. Bergner
James H. Bell
INVENTOR:
Carl A. Baer,
BY
ATTORNEYS.

Patented Oct. 30, 1923.

1,472,624

UNITED STATES PATENT OFFICE.

CARL A. BAER, OF PHILADELPHIA, PENNSYLVANIA.

COMBINED POWER AND TRANSMISSION UNIT.

Application filed June 22, 1921. Serial No. 479,608.

*To all whom it may concern:*

Be it known that I, CARL A. BAER, a citizen of the United States, residing in Philadelphia, in the county of Philadelphia and State of Pennsylvania, have invented certain new and useful Improvements in Combined Power and Transmission Units, whereof the following is a specification, reference being had to the accompanying drawings.

My invention relates to combined power and transmission units useful in driving apparatus or machines of various types and particularly looms, requiring steady power for their operation.

Amongst the objects of my invention are to secure in devices such as referred to, greater compactness than possible with mechanisms heretofore designed for a similar purpose, especially with a view toward confining them wholly within the boundaries of a machine such as a loom to which they are applied to the avoidance of any projections there beyond; and to make it possible in devices wherein a number of intermission gears are employed, to compensate for inaccuracies in the gears themselves, or in the spacing of the centers or axes about which the gears rotate in order to gain the advantage of correspondingly higher efficiency in avoiding unnecessary or excessive backlash, and also to allow of interchange of gears so that power may be transmitted at different speeds.

Other objects and attendant advantages of my invention will become apparent from the detailed description thereof which follows.

In the drawings, Fig. I is an illustration showing my invention in a convenient form for driving a loom of standard construction.

Fig. II is an elevation of the organization as viewed from the right of Fig. I, with only those parts of the loom shown which are necessary to the ready understanding of my invention.

Fig. III is a plan view of the same.

Figs. IV and V are respectively a perspective view and an axial sectional view of a special type of bearing bushing which I employ in my improved power and transmission unit.

Figs. VI and VII are views similar to Figs. I and II of a slightly modified form of my invention, Referring first to Figs. I, II and III of the drawings, I have there shown a combined power and transmission unit typical of my invention in one embodiment as conveniently adapted to driving a loom of standard construction. Power for its operation is derived from an electric motor 1 which is mounted upon a horizontal support 2. Said support at its forward end, has an integral, depending, front plate 3 which is curved in conformity with, and secured to the outside face of the loom frame 5 by means of bolts 6, allowance being made for a certain amount of vertical adjustment by provision of elongated bolt slots in said plate as shown in dotted lines in Fig. I. An insert piece 7 serves as a filler within the channel in the loom frame at the region of attachment of the motor support 2. From Figs. II and III, it will be observed that the motor support 2 extends rearwardly from the top of the loom frame 5, and its inner end is sustained by aid of a brace 8 which is adjustably secured at opposite extremities, to the inside face of the loom frame and the support 2 by means of bolts 10 and 11, respectively. At the region of attachment of the brace to the loom frame, I employ a filler piece 12 which is serviceable in the same manner as the filler piece 7 previously described.

The motor support 2 has also an integral outwardly extending portion 13, whereto an extension arm 14 is bolted with provision for horizontal adjustment. The extension arm 14 has in turn, an integral vertical face plate 15 for the attachment of a gear bracket 16 which is secured, with capacity for vertical adjustment, by bolts 17. Said gear bracket, it will be noted from Fig. I, extends in an inclined position and in a direct line from the axis of the shaft 18 of the motor to the loom driving shaft indicated at 19. The upper end of the bracket 16 has an inwardly extending boss 20 (Fig. II) which is suitably apertured to receive a rotatively adjustable, eccentrically bored bushing such as shown at 21 in Figs. IV and V. The latter, in practice, is made of non-resistive bearing metal preferably phosphor bronze and has a polygonal head 22 by aid of which it may be readily turned during adjustment. Suitable oil grooves at 23 and communicative radial ducts 24 are provided to distribute a suitable lubricant to the bore of the bushing. Any suitable means may be employed in fixing the bushing in adjusted positions, for example a set screw 25, see Figs. II and III.

Rotative within the bushing 21 is a stub shaft 26 whereto is mounted, directly adjacent the boss 20 of the bracket 16, a gear pinion 27. The stub shaft is axially aligned with, and receives motion from the motor shaft 18, through the instrumentality of an interposed flexible coupling conventionally represented at 28 in Fig. II. Said coupling serves to absorb most of the vibrations incidental to the operation of the motor and the associated parts. The gear pinion 27 meshes with a gear 29 which is operative as an intermediate or idler between the pinion and a gear 30 on the driving shaft 19 of the loom. The idler 29 rotates freely about a stud 31 immovably secured to the bracket 16 by means of a key as clearly shown in Fig. I.

The lower end of the bracket 16 is sustained by the loom shaft 19 through cooperation of an integrally bored phosphor bronze bushing 32 similar to the bushing 21 previously referred to, and is held from lateral displacement on the shaft between the inside of a bracket 33 forming part of the loom and a collar 34, see Fig. II.

By reason of the rotatable adjustment of which the bushings 21 and 32 are capable, any inaccuracy in the gears may be readily compensated for to the avoidance of any undue backlash and with resulting attainment of maximum efficiency in driving. Aside from the consideration just mentioned, the adjustment of the upper bushing 21 allows of interchange of driving pinions so that the speed of the motion transmitted may be varied if found necessary in meeting various exigencies of practice. Application of the device to the machine or apparatus which is to be driven, it will be noted, is greatly facilitated through the adjustability accorded the elements whereby the several movable parts of the unit are supported, and also that the gears may be accurately aligned through these adjustments. It is further to be noted that the unit is so designed that when applied to the loom, it lies within the confines of the same, therefore, requiring no additional floor space for its accommodation.

In the modification of my invention shown in Figs. VI and VII, the driving pinion indicated at 50 is mounted directly upon the shaft 51 of the actuating motor 52. As a consequence of the omission of the interposed flexible coupling of the former embodiment, it is possible to shift the motor somewhat further outward with respect to the loom frame and the supporting base 53 is accordingly constructed slightly different in this instance in that its attachment plate 55 depends centrally therefrom. Moreover, instead of being secured to the front of the loom frame as before, it is in this case secured to the back thereof, bolts 56 being employed and vertical adjustment provided for a purpose similar to that previously described in connection with the first embodiment. Such construction of the supporting base for the motor, it will be apparent, obviates necessity for use of a supplemental brace such as shown at 8 in Fig. II. An extension arm 60 is employed as before for the attachment of a gear bracket 61, but the gear bracket in this instance serves only as a support for the intermediate or idler gear 62 which is interposed between the driving pinion 50 and the driven gear 63 on the shaft 65 of the loom. The lower end of the bracket 61 is sustained by, and held from lateral displacement on the shaft in a manner as already understood. The various adjustments accorded the several parts of the modified embodiment of my invention are conducive to the same ends as explained in connection with the form previously described.

Having thus described my invention, I claim:

1. A combined power and transmission unit comprising a motor; a support for the motor adapted to be secured to the frame of the apparatus or machine which is to be driven; an extension arm secured to the motor base with capacity for vertical adjustment; a bracket secured, in turn, to the extension arm with capacity for horizontal adjustment; and a train of gears mounted on said bracket for transmitting power from the motor to the driving shaft of the apparatus or machine.

2. A combined power and transmission unit comprising a motor; a support for the motor adapted to be secured to the apparatus or machine which is to be driven; a bracket secured to the motor support and extending in a direct line from the motor shaft to the drive shaft of the apparatus or machine, said bracket having capacity for being adjusted both vertically and horizontally with respect to said driving shaft; and a train of gears mounted on said bracket for transmitting power from the motor to the driving shaft of the apparatus or machine.

3. A combined power and transmission unit comprising the motor; an attached bracket; a train of gears mounted on said bracket; and means whereby the gear axes may be relatively adjusted for accommodation of gears of different sizes to effect variation in the speed of the power delivered in the form of bushings capable of being rotated and set in different positions in appropriate apertures in the bracket, said bushings being eccentrically bored to receive the studs or shafts about the axes of which the gears rotate.

4. A combined power and transmission unit for application to looms to convert the same to direct motor drive, comprising a motor support designed to conform to the frame of the loom for attachment thereto, a motor mounted on the support, a gear support depending from the motor support and designed to partially support the drive shaft of the loom, said shaft being designed to carry a driven gear, transmission gears carried by the gear support and driven by the motor, and an adjustable connection between the loom drive shaft and the gear support affording adjustive movement of the former relative to the transmission gears to effect proper meshing of the gears and to permit substitution of larger gears.

5. A combined power and transmission unit for application to looms to convert the same to direct motor drive, comprising a motor support designed to conform to the frame of the loom for attachment thereto, a motor mounted on the support, a gear support depending from the motor support, and adapted to form a bearing for the loom drive shaft, an idler gear carried by the gear support adapted to mesh with a gear carried by the drive shaft, a pinion carried by the gear support driven by the motor and meshing with the idler, and connections between the gear support and the pinion and loom driven shaft permitting adjustment of the two last mentioned elements toward and away from the idler to insure proper meshing of the gears or the substitution of larger gears.

6. A combined power and transmission unit for application to looms to convert the same to direct motor drive, comprising a motor support designed for detachable mounting on one end standard of the loom, a driven shaft, a motor and gearing for driving said shaft carried by the motor support, and a brace secured to the standard and extending beyond the weight center of the motor and support.

7. In a loom including the drive shaft, a motor, a gear support, an idler gear mounted on said support, for meshing engagement with a gear mounted on the drive shaft, an extension of the motor shaft, an eccentrically bored bushing receiving said extension and mounted for rotative adjustment in the support, a pinion on said extension meshing with the idler, a second eccentrically bored bushing receiving the drive shaft and mounted for rotative adjustment in the support, and means to secure the bushings against movement subsequent to adjustment.

In testimony whereof, I have hereunto signed my name at Philadelphia, Pennsylvania, this 20th day of June 1921.

CARL A. BAER.

Witnesses:
 JAMES H. BELL,
 E. L. FULLERTON.